United States Patent
Toda et al.

(10) Patent No.: US 6,796,730 B2
(45) Date of Patent: Sep. 28, 2004

(54) PRINTING SYSTEM AND PRINTING APPARATUS

(75) Inventors: Masanari Toda, Kanagawa (JP); Tatsuro Uchida, Kanagawa (JP); Hiroshi Omura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/334,975

(22) Filed: Jan. 2, 2003

(65) Prior Publication Data

US 2003/0133141 A1 Jul. 17, 2003

(30) Foreign Application Priority Data

Jan. 17, 2002 (JP) .......................................... 2002-009163

(51) Int. Cl.[7] .......................... B41J 11/36; G06F 15/00
(52) U.S. Cl. ........................................ 400/76; 358/1.16
(58) Field of Search .............................. 400/61, 62, 63, 400/70, 76; 358/1.11, 1.13, 1.15, 1.16, 1.17, 1.2, 1.5, 2.1; 708/494, 825; 747/15, 40, 56

(56) References Cited

U.S. PATENT DOCUMENTS

| | | | | |
|---|---|---|---|---|
| 5,822,510 A | * | 10/1998 | LeClair et al. | 358/1.16 |
| 5,870,534 A | * | 2/1999 | Tsuchitoi | 358/1.16 |
| 6,088,120 A | * | 7/2000 | Shibusawa et al. | 358/1.15 |
| 6,337,744 B1 | * | 1/2002 | Kuroda | 358/1.13 |
| 6,348,969 B1 | * | 2/2002 | Ikeda | 358/1.15 |
| 6,504,949 B2 | * | 1/2003 | Matsukubo et al. | 382/162 |
| 6,504,955 B2 | * | 1/2003 | Oomura et al. | 382/173 |
| 6,512,595 B1 | | 1/2003 | Toda | 358/1.9 |
| 6,538,764 B2 | * | 3/2003 | Ueda | 358/1.16 |
| 6,633,401 B1 | * | 10/2003 | Kojima | 358/1.15 |
| 6,665,081 B1 | * | 12/2003 | Suzuki et al. | 358/1.13 |
| 2001/0024288 A1 | * | 9/2001 | Toda | 358/1.9 |
| 2002/0051197 A1 | * | 5/2002 | Minegishi | 358/1.15 |
| 2002/0054312 A1 | * | 5/2002 | Tomita | 358/1.13 |
| 2002/0067492 A1 | * | 6/2002 | Ueda | 358/1.9 |
| 2003/0007180 A1 | * | 1/2003 | Urasawa et al. | 358/1.16 |
| 2003/0133158 A1 | | 7/2003 | Uchida | 358/1.18 |

* cited by examiner

*Primary Examiner*—Andrew H. Hirshfeld
*Assistant Examiner*—Hoai-An D. Nguyen
(74) *Attorney, Agent, or Firm*—Fitzpatrick, Cella, Harper & Scinto

(57) ABSTRACT

To provide a printing system and a printing apparatus which can ensure high-speed, normal printing with small memory requirements even when lots of print commands are sent to a printer. The printing apparatus includes a print mode determination unit which judges whether intermediate-language data can fit in a page memory when print command data is converted in normal print mode and selects the normal print mode if the data can fit in, but selects compressed print mode if the data cannot fit in. Furthermore, the print mode determination unit includes a data reprocessing unit which, when the compressed print mode is selected, reduces any compressible part of intermediate-language data which corresponds to fine-gradation image data in normal print mode using a compression/decompression process, output gradation conversion process, clipping process, or reversible compression process whichever is applicable before storing it again in the page memory.

33 Claims, 12 Drawing Sheets

FIG. 2
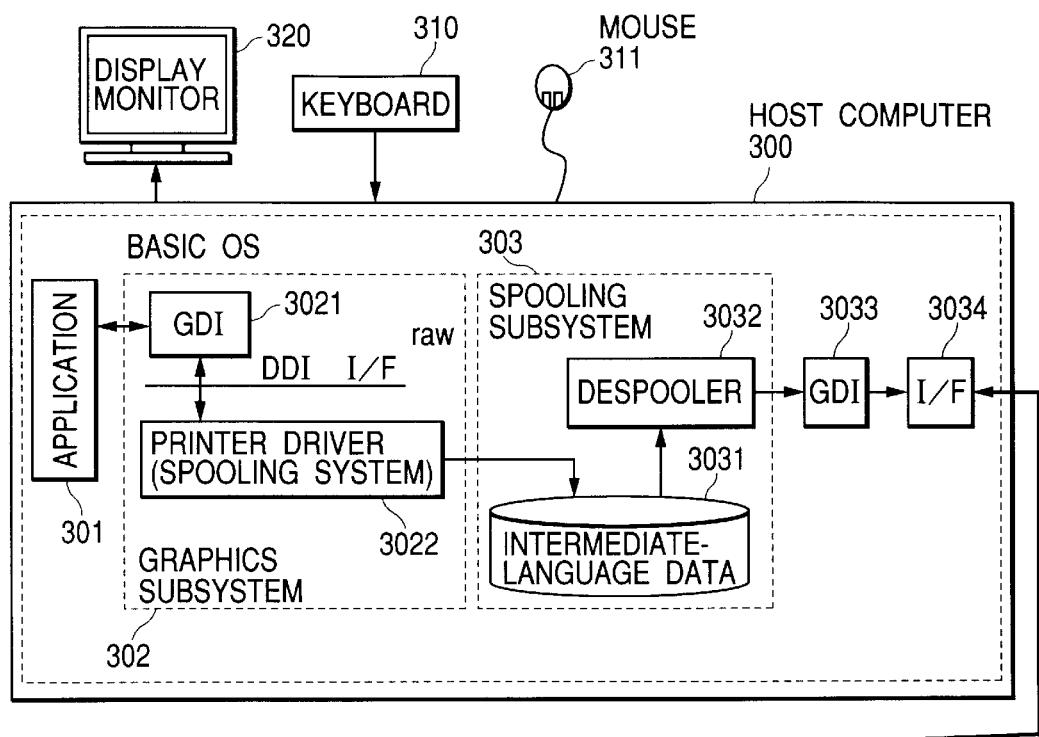
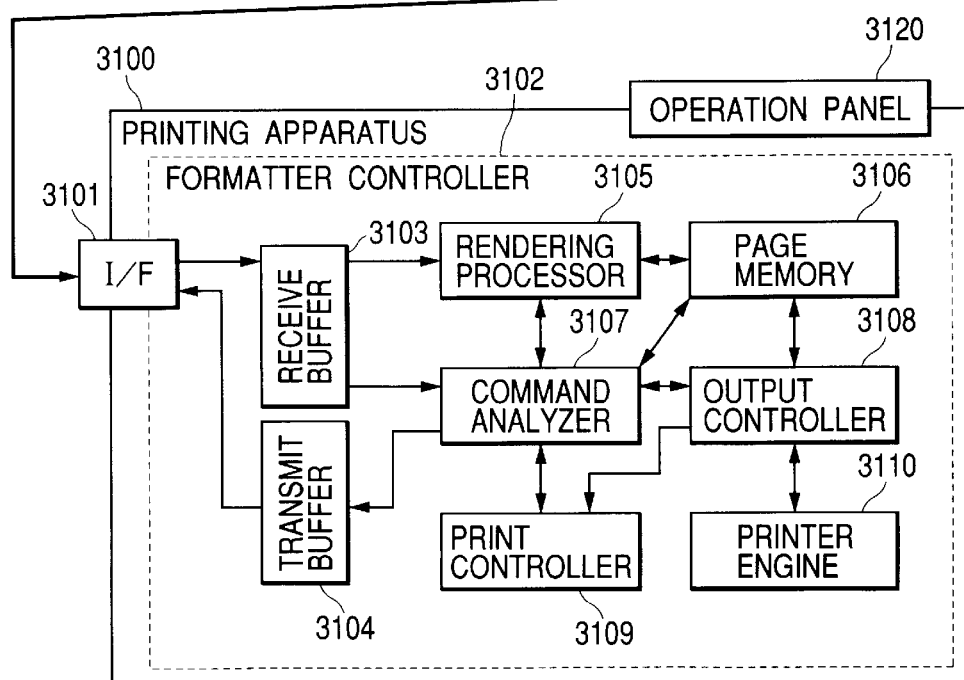

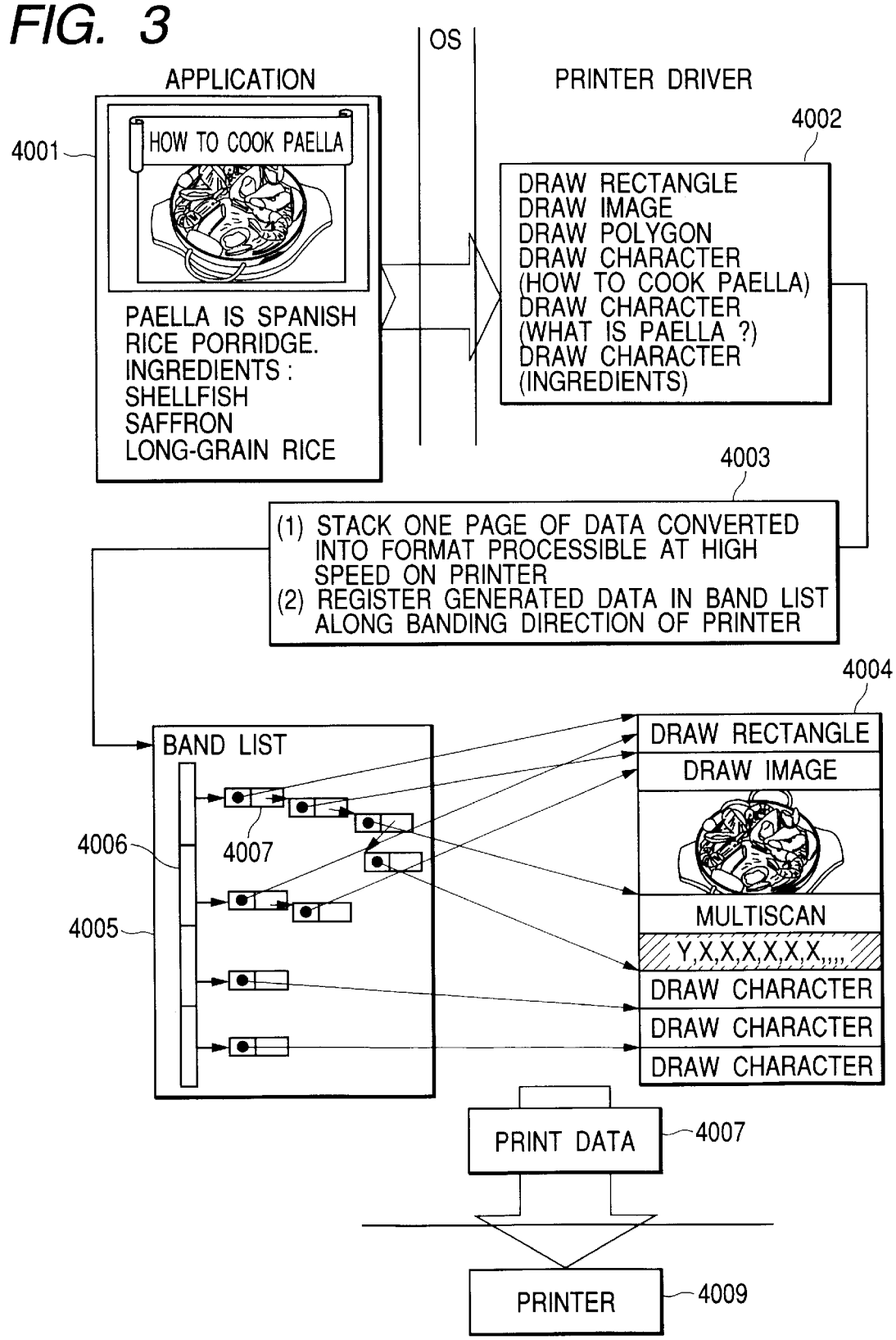

PRINTING SYSTEM AND PRINTING APPARATUS

BACKGROUND OF THE INVENTION

1. Field of the Invention

The present invention relates to a printing system and a printing apparatus. More particularly, it relates to a printing system and a printing apparatus which can ensure high-speed, normal printing with small memory requirements even when lots of print commands are sent to a printer.

2. Related Background Art

FIG. 12 is a diagram illustrating a printing control method and a flow of printing processes on a conventional printing system. Generally, the conventional printing system consists of a host computer 2000 and printing apparatus 2100 connected via a parallel communications device (such as a Centronics interface) or network communications device.

On the host computer 2000, application software 201 (hereinafter referred to as "applications") such as a word processor and spreadsheet is running on so-called basic software such as Windows (a registered trademark of Microsoft Corporation). To carry out printing in this application, the applications use functions of a graphic subsystem from among a number of subsystems provided by the basic software among programs. The graphic subsystem, which is called, for example, GDI (Graphic Device Interface) 2002 in the case of Windows (registered trademark), processes image information for a display and printer.

The GDI 2002 dynamically links a module called a device driver to cancel out device dependence on a display or printer and produces output to each device. The module for a printer is called a printer driver 2003. The printer driver 2003 must provide a function group called a DDI (Device Driver Interface) which is designed to be mounted in the device driver according to its capabilities, features, etc. The GDI 2002 converts API (Application Programming Interface) calls from an application for the device driver and calls the DDI function group, as required, to carry out a predetermined printing process.

In this way, the GDI 2002 processes print requests from applications sequentially via the printer driver. Printer drivers are roughly divided into image mode printer drivers which themselves prepare data in image data format used for output and PDL mode printer drivers which handles PDL (Printer Description Language) commands intended for printers capable of rendering.

PDL mode printer drivers will be described here. The printer driver 2003 generates a PDL command for each DDI function. The generated print commands are sent out to the printing apparatus 2100 via the GDI 2002 and an I/F 2004.

The print commands are stored temporarily in a receive buffer 2103 and analyzed by a command analyzer 2107. Intermediate-language data processible at high speed on a printer is generated as a result of the analysis and stored in an intermediate-language data storage area of a page memory 2106. The intermediate-language data is generated in units of bands. When one page of intermediate-language data is accumulated in the page memory 2106, a list structure corresponding to band areas (a unit of processing) is generated. The list structure created in this way is referred to as a band list.

Using the intermediate-language data linked to the band list, a rendering process is carried out in band memory areas of the page memory 2106 provided by hardware or software. The image data generated on the band memory is converted into video signals (shipping process) in synchronization with rotation of an engine. By providing two such band memories and using them repeatedly, it is possible to carry out the rendering and shipping processes in synchronization with the engine in a limited memory space.

However, such a conventional technique has the following problems. Specifically, in PDL-mode processing, since all data received from DDI functions are converted as draw commands, theoretically there is no upper limit to the size and number of print commands. Therefore, if the size of intermediate-language data exceeds the intermediate-language data storage area in the printing apparatus 2100, one page of intermediate-language data cannot be generated, and thus the banding process cannot be carried out. Also, if the printer driver issues complex or a large number of drawing commands to some part, rendering time for a particular band becomes longer on the printing apparatus 2100 than the time required for shipping to the printer engine, resulting in a print overrun error in which printing stops in the middle, and thus making synchronous band rendering impossible.

Page printers have solved such problems using a combination of the following methods.

One of the methods is a sub-closing scheme. This method consists of four steps. In the first step, intermediate-language data which has been stored before the page memory is overflowed is drawn and compressed (PackBits, Run Length, JBIG, or other compression) using an extraction band memory and the rendered and compressed image data is retained as compressed intermediate-language data. In the second step, stored intermediate-language data which has been rendered is erased to increase free space in the page memory. In the third step, intermediate-language data yet to be stored is placed in the free space and when the entire page has been stored in the page memory, the compressed image data reregistered in the first step is treated as intermediate-language data to enable synchronous band rendering. In the fourth step, the first step is repeated if the page does not fit in the page memory after the above processes. Incidentally, compressed image data which has already been registered is rendered first, the new intermediate-language data is rendered, and the entire band is compressed again.

Another method is a pre-banding scheme. In this mode, if intermediate-language data is concentrated on one band, a rendering process may not be able to keep up with engine speed. Thus, if a band area is so judged, when intermediate-language data is registered within a printer, a rendering process is carried out in a band memory prepared before the engine is started up.

Of the schemes described above, the sub-closing scheme, which retains developed images in a compressed state for memory saving, has the problem that a sub-closing process will decrease throughput considerably because compression and expansion, when repeated, will take time.

On the other hand, the pre-banding scheme has the problem that it cannot secure a memory area required for pre-banding if pre-banding processes must be carried out in two or more bands, which fact is liable to cause a shift to a sub-closing process.

Thus, although conventional schemes provide memory-saving, high-speed printing systems if synchronous banding is available, they have the problem that additional processing time is required if synchronous banding is disabled frequently.

SUMMARY OF THE INVENTION

The present invention has been achieved in view of the above problem. Its object is to provide a printing system and printing apparatus which can ensure high-speed, normal printing with small memory requirements even when lots of print commands are sent to a printer.

To achieve the above object, the present invention provides a printing system in which a computer provided with a printer driver is connected with a printing apparatus which runs a rendering process in response to print command data generated by the above described printer driver, wherein: the above described printer driver comprises data conversion means for converting drawing commands into an intermediate-language data format processible at high speed within the above described printing apparatus, data holding means for storing one page of the converted intermediate-language data, data information holding means for storing intermediate-language data information generated by accumulating, for each band, information such as the type, data size, item count, etc. of the intermediate-language data stored in the data holding means, and print command data generation means for converting one page of intermediate-language data into print command data; the above described printing apparatus comprises data generation means for generating intermediate-language data by interpreting the print command data from the above described printer driver, page data holding means for storing one page of the intermediate-language data, print mode determination means for analyzing the top of the page of the intermediate-language data stored in the page data holding means, thereby estimating the size of the print data, and determining a print mode based on the results of estimation, and rendering means for running a rendering process using one page of the intermediate-language data in the print mode determined by the print mode determination means; when one page of intermediate-language data is stored in the above described data holding means, the print data generation means of the above described printer driver generates print command data by adding the intermediate-language data information stored in the above described data information holding means to the top of the page of the intermediate-language data; and the print mode determination means of the above described printing apparatus judges whether the above described intermediate-language data can fit in the above described page data holding means when the above described print command data is converted in normal print mode and selects the normal print mode if the data can fit in, but selects compressed print mode if the data cannot fit in.

Also, the present invention provides a printing system in which a computer provided with a printer driver is connected with a printing apparatus which runs a rendering process in response to print command data generated by the above described printer driver, wherein: the above described printer driver comprises data conversion means for converting drawing commands into an intermediate-language data format processible at high speed within the above described printing apparatus, data holding means for storing one page of the converted intermediate-language data, data registration means for registering the above described intermediate-language data in a band list which corresponds to band processing performed within the above described printing apparatus, data information collection means for collecting intermediate-language data information for each above described band list registered with the data registration means, print command data generation means for converting one page of intermediate-language data into print command data in sequence beginning with the one registered at the top of the band list with page information containing the all collected band information at the head as soon as one page of intermediate-language data is accumulated in the above described data holding means; the above described printing apparatus comprises data generation means for generating intermediate-language data by interpreting the print command data from the above described printer driver, page data holding means for storing one page of the intermediate-language data, synchronous/asynchronous mode judgement means for determining, by analyzing the page information stored in the page data holding means, whether or not to carry out a rendering process in synchronization with an engine, engine-synchronized rendering means, and non-engine-synchronized rendering means.

Also, the present invention provides a printing apparatus, comprising: data generation means for generating intermediate-language data by interpreting print command data from a printer driver; page data holding means for storing one page of the intermediate-language data; print mode determination means for analyzing the top of the page of the intermediate-language data stored in the page data holding means, thereby estimating the size of the print data, and determining a print mode based on the results of estimation; rendering means for rendering one page of intermediate-language data in the print mode determined by the print mode determination means, wherein the above described print mode determination means judges whether the above described intermediate-language data can fit in the above described page data holding means when the above described print command data is converted in normal print mode and selects the normal print mode if the data can fit in, but selects compressed print mode if the data cannot fit in.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a diagram illustrating a configuration of a formatter controller provided in the printing apparatus of the present invention;

FIG. 3 is a diagram illustrating operation of a printer driver installed in a computer in the printing system of the present invention;

DESCRIPTION OF THE PREFERRED EMBODIMENTS

A preferred embodiment of the present invention will be described below with reference to the drawings.

Figure 1:
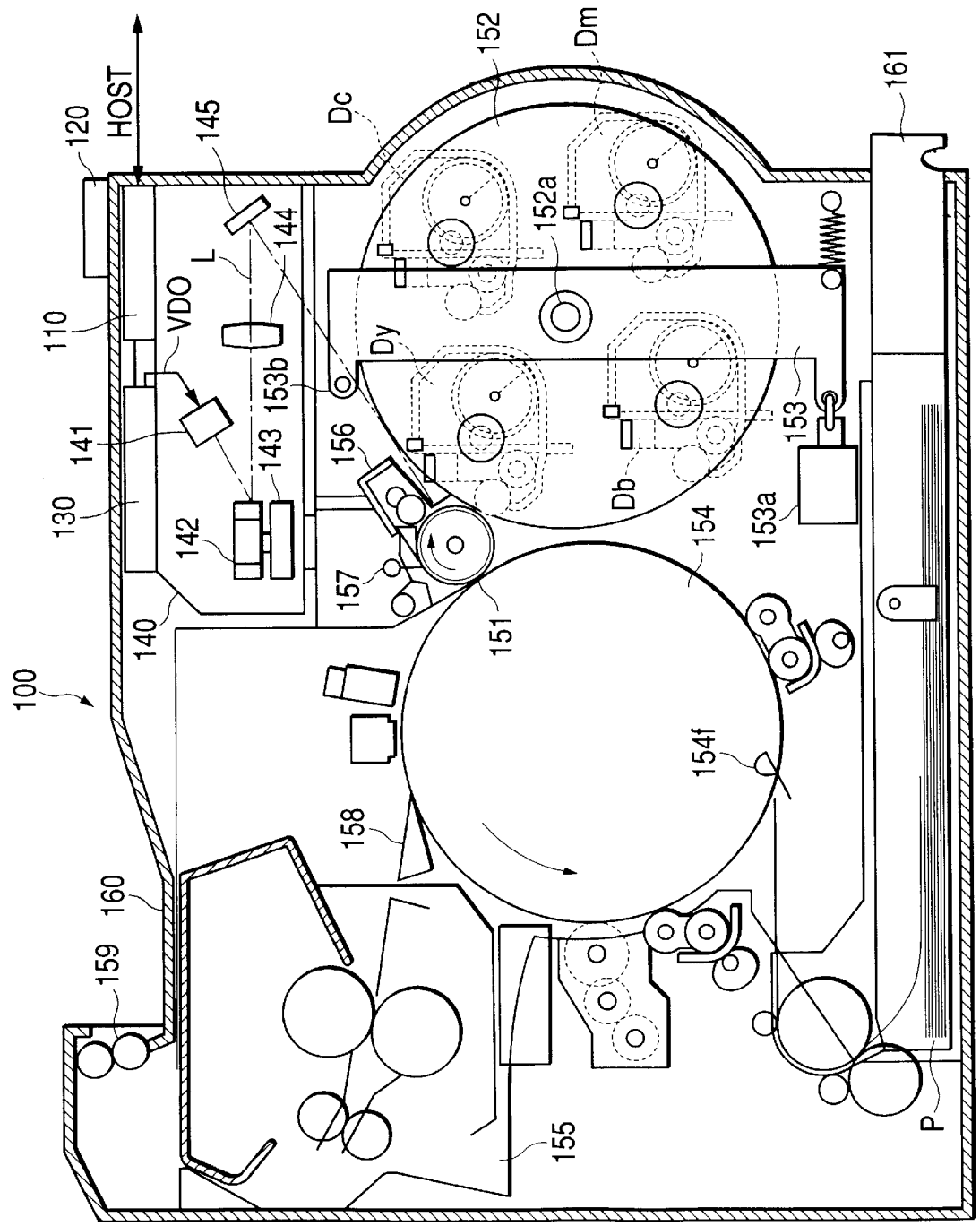
FIG. 1 is a diagram illustrating a configuration example of a printing apparatus in a printing system of the present invention.

FIG. 1 is a diagram illustrating a configuration example of a printing apparatus in a printing system of the present invention. It is assumed here that the printing apparatus is a color laser beam printer (hereinafter referred to as a "color LBP").

The color LBP has a resolution of 600 dots/inch (dpi) and records images based on multi-value data in which each pixel of each color component is represented by 8 bits. In FIG. 1, reference numeral 100 denotes the main unit of the color LBP, which accepts and stores print information, consisting of print data (character codes, image data, etc.) and control codes, supplied from a host computer or the like connected externally, creates corresponding character patterns, images, etc., and forms images on a recording medium, such as recording paper, based on the above information.

Reference numeral 110 denotes a formatter controller which analyzes print information supplied from the host computer and generates print images as well as controls the main unit of the color LBP 100. Also, the formatter controller 110 is connected with an operation panel 120 which contains switches, LED indicators, etc. for user operations and status notifications. The panel is installed as part of the exterior of the main unit of the color LBP 100.

Final print images generated by the formatter controller 110 is sent out as video signals to an output controller 130, which controls printing on the main unit of the color LBP 100: receives status information from various sensors (not shown) on the main unit of the color LBP 100 and outputs various control signals to an optical unit 140 and various drive mechanisms.

In the printing apparatus shown in FIG. 1, paper P supplied from a paper cassette 161 is held around a transfer drum 154 with its tip gripped by a gripper 154f. Latent images corresponding to color components formed on a photosensitive drum 151 by the optical unit 140 are developed by developing devices Dy, Dm, Dc, and Db for yellow (Y), magenta (M), cyan (C), and black (B) and are transferred to the paper around the transfer drum multiple times to form a multi-colored image.

Then, the paper P is separated from the transfer drum 154, fixed by a fixing unit 155, and discharged by a paper ejector 159 to a paper output tray 160. The developing devices Dy, Dm, Dc, and Db for the colors have pivot pins at both ends and are held by a developing device selector 152 so that each of them can rotate on the pins. This allows the developing devices Dy, Dc, Db, and Dn to maintain their attitude as shown FIG. 1 even if the developing device selector 152 rotates on a rotation axis 152a to select a developing device.

After the selected developing device moves to a developing position, as a selector support frame 153 is pulled to the photosensitive drum 151 by a solenoid 153a, the developing device selector 152 moves together with the developing device toward the photosensitive drum 151, rotating around a supporting point 153b, to carry out a developing process.

Then, the photosensitive drum 151 is charged uniformly to a predetermined polarity by an electrifier 156. Print information developed as a device-dependant bitmap by the formatter controller 110 is converted into a video signal with corresponding patterns and outputted to a laser driver to drive a semiconductor laser device 141. A laser beam emitted from the semiconductor laser device 141 is placed under on/off control according to the inputted video signal, is swung left and right by a polygon mirror 142 rotating at a high speed via a scanner motor 143, and thereby scans and exposes the photosensitive drum 151 through a polygon lens 134 and reflecting mirror 144, consequently forming electrostatic latent images on the photosensitive drum 151.

Next, for example, an M (magenta)-color electrostatic latent image is developed by the M (magenta)-color developing device Dm and a first toner image in M (magenta) color is formed on the photosensitive drum 151. On the other hand, the paper P is supplied with predetermined timing, and a transfer bias voltage (e.g., of positive polarity) opposite in polarity to the toner is applied to the transfer drum 154. Consequently, the first toner image on the photosensitive drum 151 is transferred to the paper P while the paper P is electrostatically attracted to the surface of the transfer drum 154. Then, residual M (magenta)-color toner is removed from the photosensitive drum 151 by a cleaner 157 to prepare for the latent image formation and developing process in the next color. Second to fourth toner images are transferred in the order C (cyan), Y (yellow), and Bk (black) according to similar procedures. However, when each color is transferred, a bias voltage higher than the previous one is applied to the transfer drum 154.

When tip of the paper P on which toner images of the four colors are transferred and superimposed approaches separation position, a paper separation claw 158 approaches, placing its tip in contact with the surface of the transfer drum 154, and separates the paper P from the transfer drum 154. The separated paper P is transported to the fixing unit 155, where the toner images on the transfer paper are fixed, and then the paper P is discharged to the paper output tray 160.

Through the image formation process described above, the color LBP according to this example outputs images at a resolution of 600 dots/inch (dpi). Incidentally, the configuration of the printing apparatus according to the present invention can be applied not only to color LBPs, but also to other types of color printers such as inkjet printers and thermal printers.

Next, a configuration of the formatter controller will be described.

FIG. 2 is a diagram illustrating a configuration of the formatter controller provided in a printing apparatus of the present invention. The formatter controller 3102 provided in the printing apparatus 3100 is commonly known as a PDL controller. It comprises an interface (I/F) 3101 which serves as a means of connection to a host computer 300, a receive buffer 3103 for temporarily maintaining receive data and the like, a transmit buffer 3104 for temporarily maintaining transmit data and the like, a command analyzer 3107 which analyzes print data, a print controller 3109, a rendering processor 3105, and a page memory 3106.

The interface (I/F) 3101 is a communications means which transmits and receives print data to/from the host computer 300. It enables communications in compliance with the IEEE 1284 communications protocol. However, the present invention is not limited to this communications means, and connections via a network based on various protocols and IEEE-1394-based communications means are also available. The print data received via the interface 3101 is accumulated in the receive buffer 3103 which temporarily holds data, and then read out and processed by the command analyzer 3107 or rendering processor 3105 as required.

The command analyzer 3107 consists of control programs which are based on a print command set or print job control language. One page of analysis results on print data related to rendering of characters, graphics, and images are stored in an intermediate-language storage area in the page memory 3106. Once one page of analysis results are stored, the print controller 3109 instructs the rendering processor 3105 to develop intermediate-language data such as characters and images one after another from the intermediate-language storage area to band memories in the page memory. Furthermore, regarding commands other than drawing commands, such as paper selection and reset commands, the print controller 3109 is instructed to process them.

The rendering processor 3105 is a renderer which develops drawing objects such as characters and images one by one to the band memories in the page memory 3106. Device-dependent bitmap data must be sent out in the MCYK surface sequence in the case of the color LBP described with reference to FIG. 1. Normally, however, not all necessary memory is secured. A band area as small as a fraction of one plane (1, 2, or 4 bits/pixel) is secured in a band memory in the page memory 3106 and is reused to process images in synchronization with engine speed.

Normally, the page memory 3106 is managed through banding control which involves alternating expansion carried out by the renderer and shipping of video signals to the printer engine, but an area large enough to expand one page of data may be provided if sufficient memory is available. Incidentally, the formatter controller 3102 generally consists of a computer system which uses a central control unit (CPU), read-only memory (ROM), random access memory (RAM), etc. Besides, processes in various parts may be carried out under multitask monitoring (real-time OS) on a time-shared basis or processes of each function may be run separately by dedicated controller hardware.

An operation panel 3120 is used to make settings and indicate various states of the printing apparatus as described above. An output controller 3108 converts content of the page memory 3106 into video signals and transfers images to a printer engine 3110, which is a printing apparatus mechanism for forming permanent visible images on recording paper based on the received video signals.

The printing apparatus 3100 has been described so far, and now description will be given of the overall configuration of the printing system according to this example, including the host computer 300.

In FIG. 2, reference numeral 300 denotes the host computer, which outputs print information consisting of print data and control codes to the printing apparatus 3100. The host computer 300 is configured as a computer system incorporating a keyboard 310 which is an input device, mouse 311 which is a pointing device, and display monitor 320 which is a display device. The host computer 300 runs on a basic OS such as Windows (registered trademark) 2000 or Windows (registered trademark) Me.

Focusing on functional components of the present invention on the side of the host computer 300, functions on the basic OS are roughly classified into application software 301, a graphic subsystem 302, and a spooling subsystem 303 which includes print information storage means and means of communications with the printing apparatus.

The application software 301 is an application such as a word processor and spreadsheet running on the basic software. The graphic subsystem 302 consists of the Graphic Device Interface (hereinafter referred to as "GDI") 3021 which constitutes part of OS's drawing functions and a printer driver 3022 which is a device driver dynamically linked to the GDI 3021. The application 301 outputs drawing information to the GDI using an interface provided by GDI functions. The GDI 3021 converts the GDI functions received from the application 301 into DDI functions interpretable by the printer driver 3022.

The printer driver 3022 is called by the GDI via an interface known as DDI (Device Driver Interface) and carries out processes for each drawing object according to the device. In this system, information passed to a DDI function is converted into a data format processible at high speed on the printer and is written page by page into files as intermediate-language data 3031 (spooling). The spooling subsystem 303, which is located downstream of the graphic subsystem 302, is a subsystem typical of printer devices. A module which reads out intermediate-language data 3031 will be called a despooler 3032.

The despooler 3032 generates a band list containing bands used as the unit of rendering performed on the printer and registers intermediate-language data mapped to memory by linking it to band pointers which point to drawing positions. In doing that, the despooler 3032 summarizes attribute information on the intermediate-language data registered for each band, including the type, data size, item count, etc. of the intermediate-language data, and holds the summarized attribute information in a predetermined storage area.

Once one page of intermediate-language data is registered in the band list, the total size of the intermediate-language data contained in the page as well as the type, item count, and size of the intermediate-language data contained in each band are calculated based on the summarized information held for each band. Then, preceded by the page data thus prepared (including band-specific information), the intermediate-language data are arranged beginning with the one linked to the top band to generate a print command.

In this way, the despooler 3032 reads spool data, generates a print command, and sends out data to the printer via GDI 3033 and I/F 3034 Although the names and functional framework described above may vary slightly with the basic OS, the names and framework of modules do not matter much to the present invention as long as the modules can implement the technical means of the present invention. For example, the spooler and spool files, as referred to herein, may also be implemented by incorporating processes in a module called a print queue on another OS. Incidentally, the host computer 300 which incorporates such functional modules is generally designed such that application software and subsystem processes operate as the respective functional modules under the control of software called basic software using hardware such as a central control unit (CPU), a read-only memory (ROM), a random access memory (RAM), a hard disk drive (HDD), and various input/output (I/O) controllers.

An ideal embodiment of the printer driver for the printing apparatus of the present invention will be described below.

FIG. 3 is a diagram illustrating operation of a printer driver for the printing apparatus of the present invention. When printing "How to Cook Paella" 4001, a document prepared by a typical document processing application and containing graphics, characters, and images, a drawing command 4002 is passed via the OS to the printer driver installed on the OS. It is assumed here that the drawing command 4002 contains abstract objects such as polygons and characters although a drawing command varies with the composition of the OS and printer driver.

The printer driver converts each drawing command into a data format processible at high speed on the printer to generate and spool one page of intermediate-language data 4004.

Figure 4A:
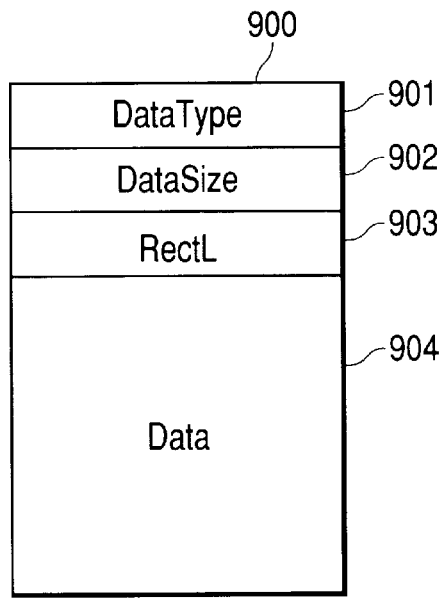
FIG. 4A is a diagram showing an exemplary structure of intermediate-language data.
Figure 4B:
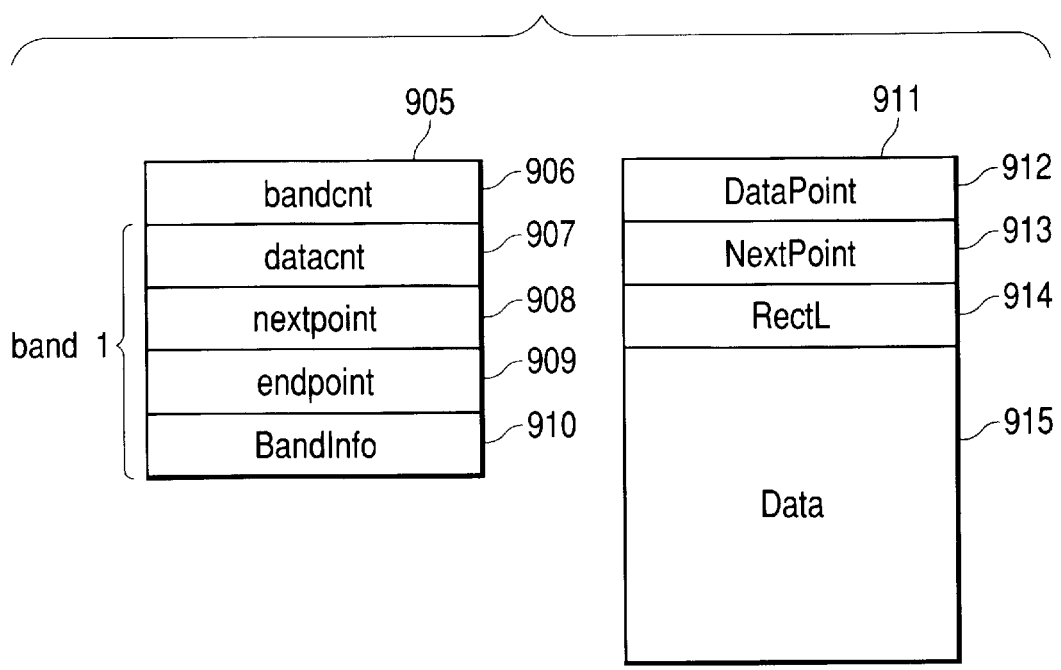
FIG. 4B is a diagram showing an exemplary structure of a band list.

FIG. 4A shows an exemplary structure of intermediate-language data while FIG. 4B shows an exemplary structure of a band list.

As shown in FIG. 4A, intermediate-language data 900 consists of data elements: DataType 901 which indicates the type of data, DataSize 902 which indicates the size of the data, RectL 903 which indicates a drawing area by circumscribed rectangular coordinates (leftx, rightx, bottomy, topy), and Data 904 which contains the main data. By organizing intermediate-language data into a set of these data elements, it is possible to establish links to a band list 4005 quickly along the banding direction of the printer shown in FIG. 3 by simply referring to the header section 901 to 903.

Once one page of data is spooled, the despooler generates a band list 4005 according to the banding direction of the printer. The band list consists of a band list management table 4006 and data management structures 4007 and links the intermediate-language data related to rendering of each band in the order of processing. When linking the table, information such as the type, size, and item count of the intermediate-language data for each band is integrated in the table. At this time, since the intermediate-language data is converted into data processible at high speed in the printer, the data size, item count, etc. determined here exactly match those of the data stored in the printer.

The band list 4005 will be described in more detail with reference to FIG. 4B. The band list 4005 consists of a band list management table 905 and data management structures 911. The band list management table 905 consists of bandcnt 906 which indicates the number of bands in the page, followed by, datacnt 907 which indicates the number of registered data items, nextpoint 908 which indicates a pointer to the first data management structure linked to a band, endpoint 909 which indicates a pointer to the last data management structure in the link structure, and BandInfo 910 which contains information about the linked intermediate-language data (data type, size, item count, etc.). A set of datacnt 907 which indicates the number of registered data items, nextpoint 908 which indicates a pointer to the first data management structure linked to a band, endpoint 909 which indicates a pointer to the last data management structure in the link structure, and BandInfo 910 holding information of linked intermediate-language data (kinds of data, size, point, etc.) occurs in succession as many times as there are bands.

Each data management structure 911 consists of DataPoint 912 which stores a pointer to the main data, NextPoint 913 which stores a pointer to the next data management structure, RectL 914 which indicates a drawing area by the outermost rectangle, and Data 915 which contains the main body of intermediate-language data 900. After generating the band list 4005, the despooler generates print data 4008 based on the band information and intermediate-language data and sends it out to a printer 4009.

Figure 5:
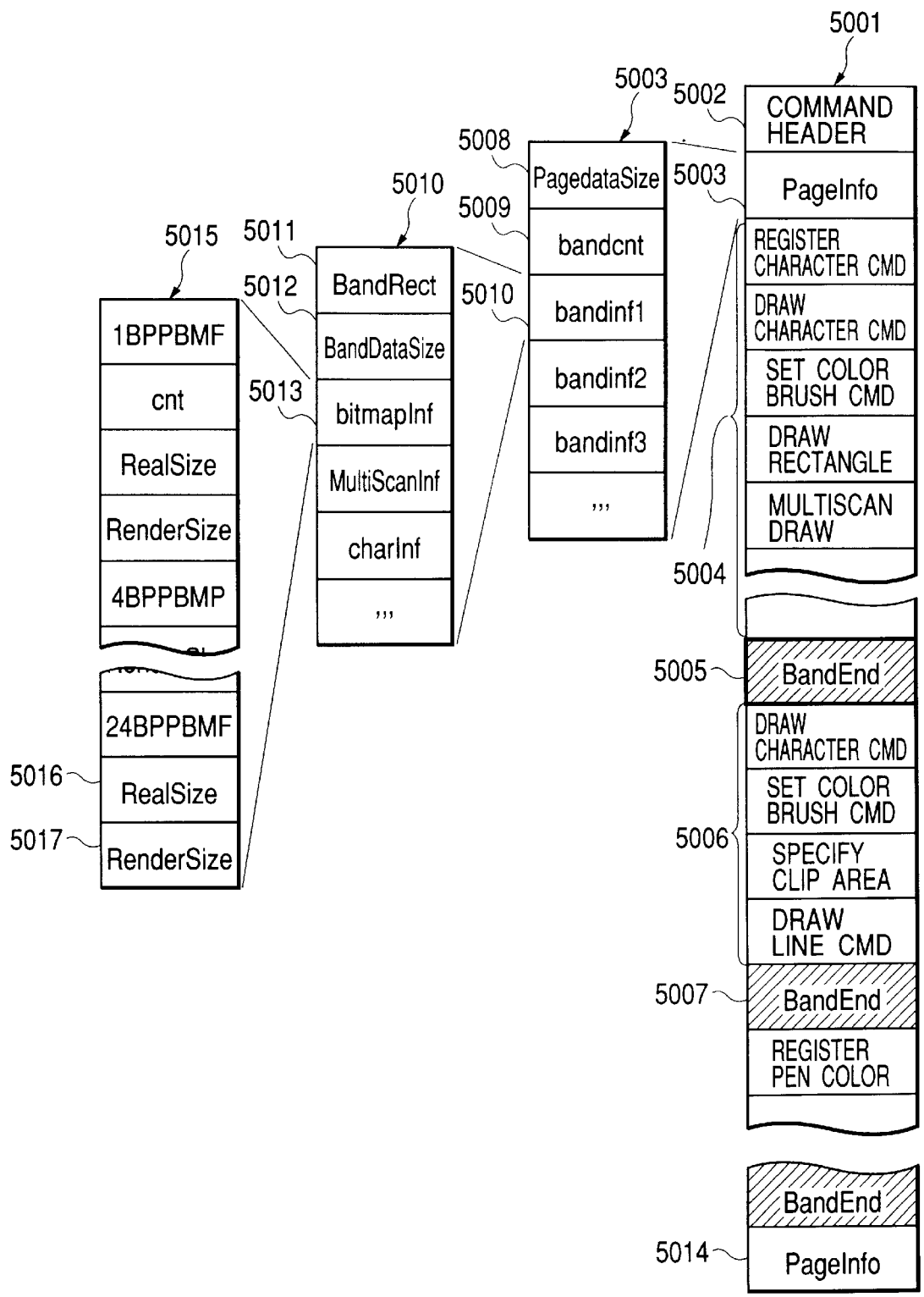
FIG. 5 is a diagram illustrating details of a print command.

FIG. 5 is a diagram illustrating details of a print command. Print data 5001 consists of language version information, CommandHeader 5002 for equipment control and the like, PageInfo 5003 which contains page information, the main body of intermediate-language data 5004, and BandEnd 5005 which indicates a band break.

PageInfo 5003 consists of pagedatasize 5008 which indicates the total size of the intermediate-language data contained in the entire page, bandcnt 5009 which indicates the number of the bands contained, and bandinf 5010 which contains band-specific information. There are as many pieces of bandinf 5010 as there are bands.

Bandinf 5010 consists of Bandrect 5011 which indicates the position of the band by a circumscribed rectangle, BandDataSize 5012 which indicates the total size of the intermediate-language data contained in the band, and bitmapinf 5013 which is information specific to each intermediate-language data contained in the band. BitmapInf 5013 contains information 5015, such as the size and item count, etc. specific to each type of bitmap data.

The main body of intermediate-language data 5004 has been converted into a data format processible at high speed on the printer. To reduce data size, any data which straddle multiple hands has been divided and processed for each band.

To provide for density calibration dynamically changing in the printer, the printer driver generates intermediate-language data for each color image in a intensity space (RGB space) or a device color space (YMCK space) using-fine gradation (8 bits/color), and thereby generates a print command.

BitmapInf 5013 holds RealSize 5016 which is the total image data size of fine-gradation intermediate-language data generated as it is and RenderSize 5017 which is the total size of intermediate-language data generated in the printing apparatus using output gradation. Incidentally, pagedatasize 5008 is calculated using RealSize 5016.

BandEnd 5005, which indicates a band break clearly, is used by the printer to detect the band break easily. However, this is not a required command because it can be calculated if bandDataSize 5012 in bandinf 5010 indicates the real data size.

Next, operation of the printing apparatus according to the present invention will be described. The printing apparatus 3100 stores at least PageInf 5003 in the receive buffer 3103. The command analyzer 3107 makes two judgments as to whether pagedatasize 5008 is smaller than the intermediate-language data storage area in the page memory 3106 (hereinafter referred to as "judgment A") and whether the rendering time calculated from intermediate-language information in Bandinf 5010 on each band fits the time required by the engine (hereinafter referred to as "judgment B").

If the criteria are met in both judgment A and judgment B, high-speed printing is available in synchronous rendering mode in which rendering is carried out in synchronization with shipping to the engine. If the criterion in judgment A is not satisfied, this means that the intermediate-language data does not fit in the printer. On the other hand, existence of any band which does not satisfy the criterion in judgment B disables synchronous rendering which involves carrying out rendering and shipping simultaneously by using the band memory. In either case, printing in high-speed mode is made impossible.

Thus, the printing apparatus of the present invention carries out processing after selecting between two rendering modes on a page-by-page basis: selecting the synchronous rendering mode in which rendering and shipping are carried out simultaneously by using the band memory if the two criteria in judgment A and judgment B are satisfied and selecting the asynchronous rendering mode in which rendering is carried out upon receipt of data if either of the criteria is not satisfied. This makes it possible to increase the use of synchronous rendering mode without increasing the amount of installed memory.

Figures 6A, 6B:
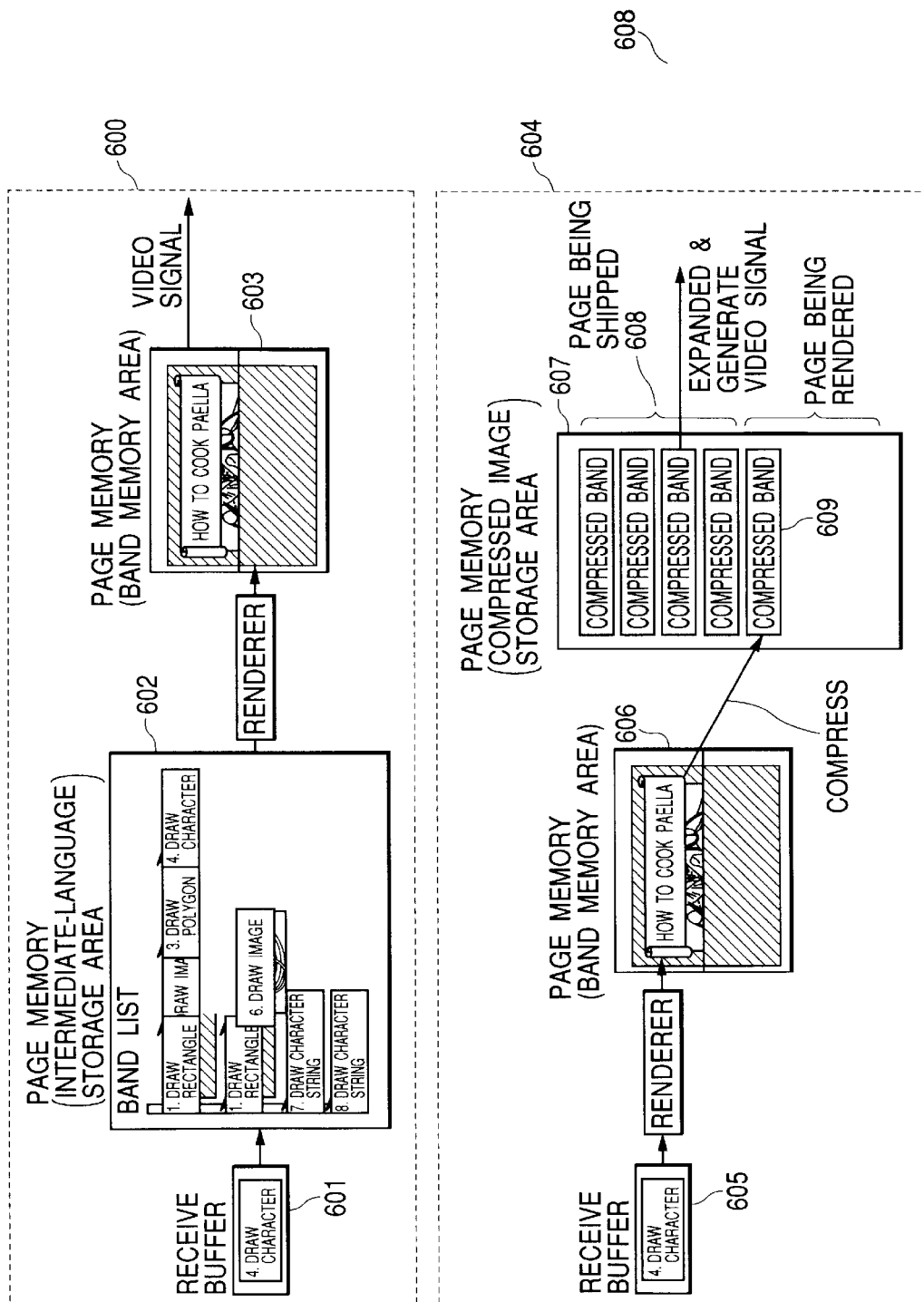
FIG. 6A is a diagram showing processes inside a synchronous-rendering controller in a printer.
FIG. 6B is a diagram showing processes inside an asynchronous-rendering controller.

FIG. 6A shows processes inside a synchronous-rendering controller in a printer while FIG. 6B shows processes inside an asynchronous-rendering controller.

As shown in FIG. 6A, in the synchronous-rendering controller 600, when print data is received by a receive buffer 601, a band list similar to the one created by a printer driver is generated in an intermediate-language data storage area 602 in the page memory by converting the received print data, and then the bands are rendered beginning with the top band by a hardware- or software-based rendering processor in a band memory area 603 in a page memory. The use of two or more band memories makes it possible to alternate "the process of sending out video signals to the engine" and "the process of rendering in the band memories", and thereby save memory.

On the other hand, in the asynchronous-rendering controller 604, intermediate-language data received by a receive buffer 605 is rendered by hardware or software directly in a band memory area 606 in a page memory, as shown in FIG. 6B. The image data rendered in the band memory area 606 is compressed (PackBits, Run Length, JBIG, or other compression) and stored in a storage area 607 for compressed data in the page memory. Once all the bands of image data are compressed, video signals are sent out to the engine by expanding compressed bands 608 for the page being shipped and compressed bands 609 for the page being rendered in real time.

Next, description will be given of a flow of processes carried out by a print control module in the host computer 300. The print control module includes the printer driver 3022 and the despooler 3032.

Figure 7:
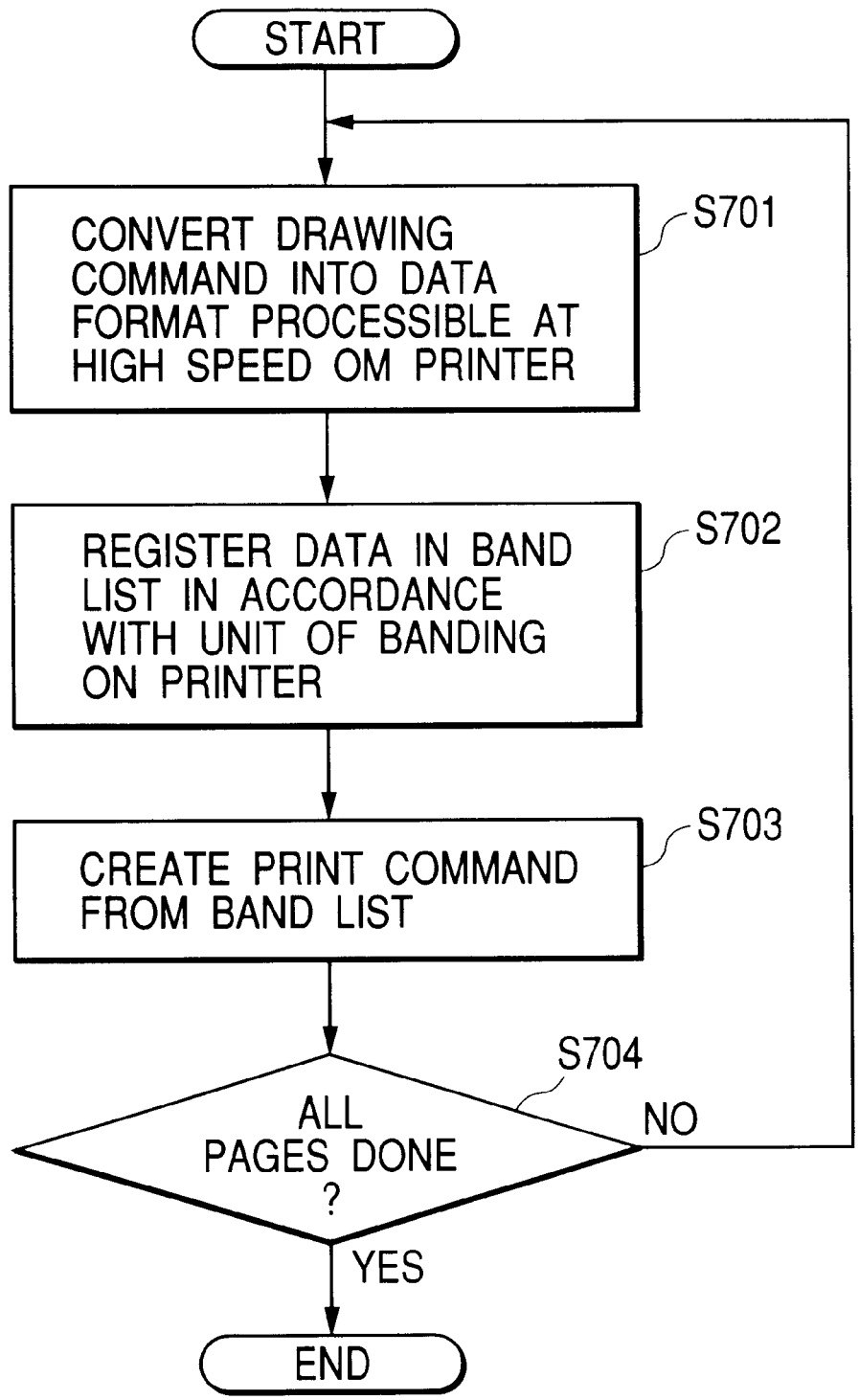
FIG. 7 is a flowchart illustrating processes inside a printer driver.

FIG. 7 is a flowchart illustrating processes inside the print control module. First, the print control module converts a drawing command received from the OS into intermediate-language data in a data format which will allow rendering at high speed on the printing apparatus and registers the data on a page-by-page basis (S701). Next, the print control module creates a band list in accordance with the unit of banding on the printing apparatus, links it with the intermediate-language data registered in Step S701 (S702), creates print data from the band list and intermediate-language data, outputs it to the GDI 3033, and thereby sends it out to the printing apparatus (S703). Then, the print control module judges whether there is any next page data (S704). If it is judged that there is a next page (S704: No), the print control module returns to Step S701 and repeats subsequent steps. If it is judged that there is no next page (S704: Yes), the print control module finishes processing.

Next, description will be given of a flow of processes for determining a processing system for each logical page in the printing apparatus.

Figure 8:
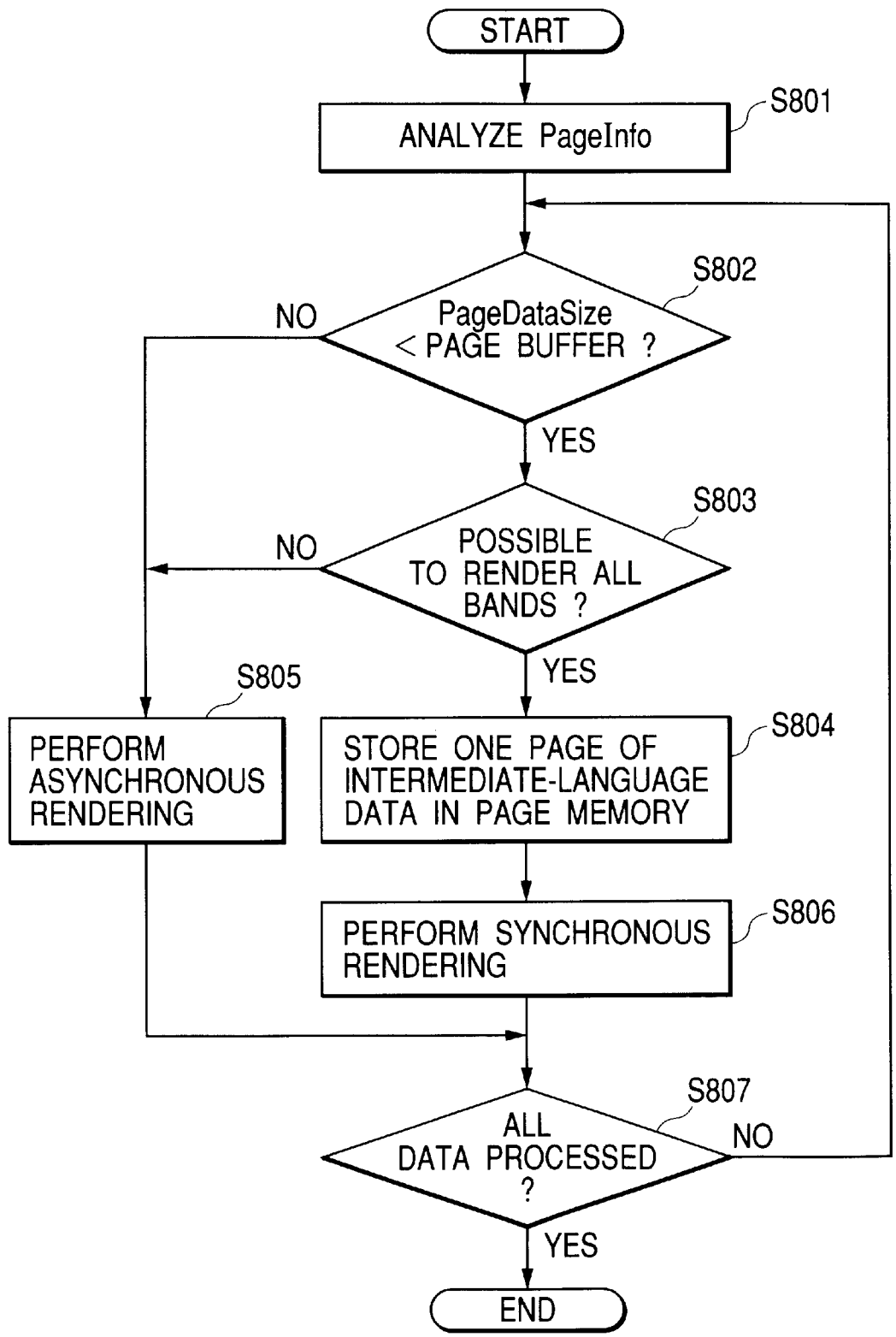
FIG. 8 is a flowchart illustrating a process example inside a controller.

FIG. 8 is a flowchart illustrating a process example inside a controller. First, the controller analyzes PageInfo (S801) and judges whether PageDataSize is smaller than the size of the intermediate-language data storage area (S802). If PageDataSize is smaller than the size of the intermediate-language data storage area (S802: Yes), the controller goes to Step S803. If PageDataSize is not smaller than the size of the intermediate-language data storage area (S802: No), the controller goes to Step S805.

In Step S803, the controller estimates the rendering time of each band by analyzing bandinf. If all the bands lend themselves to synchronous rendering (S803: Yes), the controller goes to Step S804. If all the bands do not lend themselves to synchronous rendering (S803: No), the controller goes to Step S805.

The controller stores one page of intermediate-language data in the page memory in Step S804, generates a band list and performs synchronous rendering in Step S806, and goes to Step S807. On the other hand, in Step S805, the controller performs asynchronous rendering before going to Step S807.

In Step S807, the controller judges whether all the data processing is finished. If not all the data processing is finished (S807: No), the controller returns to Step S801 and repeats subsequent steps. If all the data processing is finished, the controller finishes processing (S807: Yes).

Figure 9:
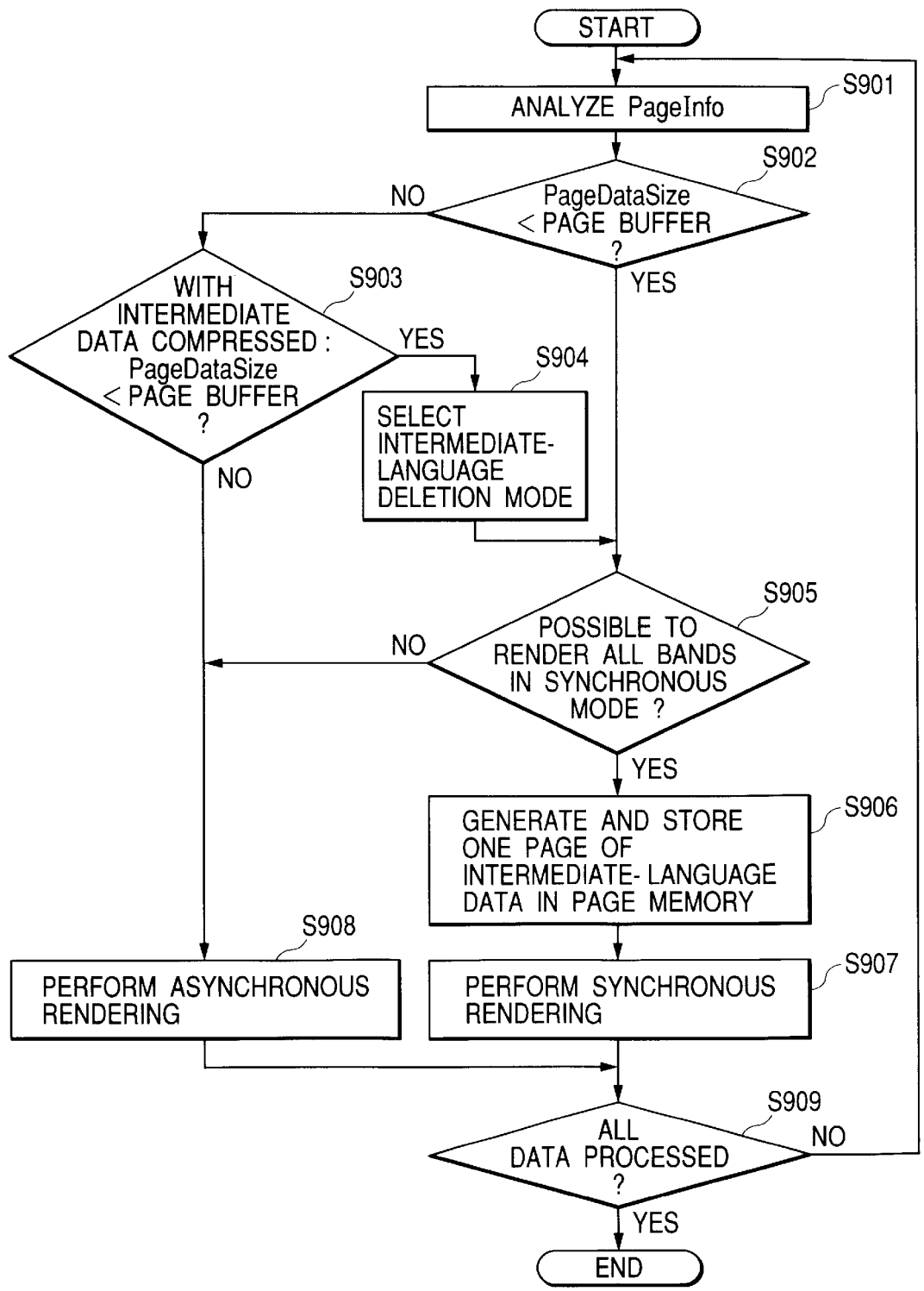
FIG. 9 is a flowchart illustrating another process example inside the controller.

FIG. 9 is a flowchart illustrating another process example inside the controller. First, the controller analyzes PageInfo (S901) and judges whether PageDataSize is smaller than the size of the intermediate-language data storage area (S902). If PageDataSize is smaller than the size of the intermediate-language data storage area (S902: Yes), the controller goes to Step S905. If PageDataSize is not smaller than the size of the intermediate-language data storage area (S902: No), the controller goes to Step S903.

In Step S905, the controller estimates the rendering time of each band by analyzing bandinf. If all the bands lend themselves to synchronous rendering (S905: Yes), the controller goes to Step S906. If all the bands do not lend themselves to synchronous rendering (S905: No), the controller goes to Step S908.

On the other hand, in Step S903, the controller checks bandinf for information about compressible data and recalculates the size of intermediate-language data which will result if the data in each band is compressed. Information concerning all bands is collected to recalculate the intermediate-language data size included in the whole pages. If it turns out that the size of the intermediate-language data contained in the entire page is smaller than the size of the intermediate-language data storage area (S903: Yes), the controller goes to Step S904. Otherwise (S903: No), the controller goes to Step S908.

In Step S904, the controller decides to process the given page in intermediate-language data compression mode, and then it goes to Step S905.

The controller stores one page of intermediate-language data in the page memory in Step S906, generates a band list and performs synchronous rendering in Step S907, and goes to Step S909. On the other hand, in Step S908, the controller performs asynchronous rendering before going to Step S909.

In Step S909, the controller judges whether all the data processing is finished. If not all the data processing is finished (S909: No), the controller returns to Step S901 and repeats subsequent steps. If all the data processing is finished (S909: Yes), the controller finishes processing.

Next, memory-saving effect of the printing apparatus according to the present invention will be described.

Figure 10A:
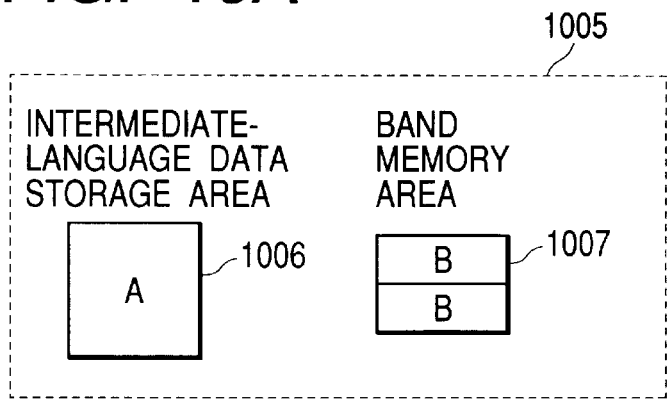
FIG. 10A is a diagram showing how memory is utilized in the printing apparatus of the present invention during synchronous rendering.
Figure 10B:
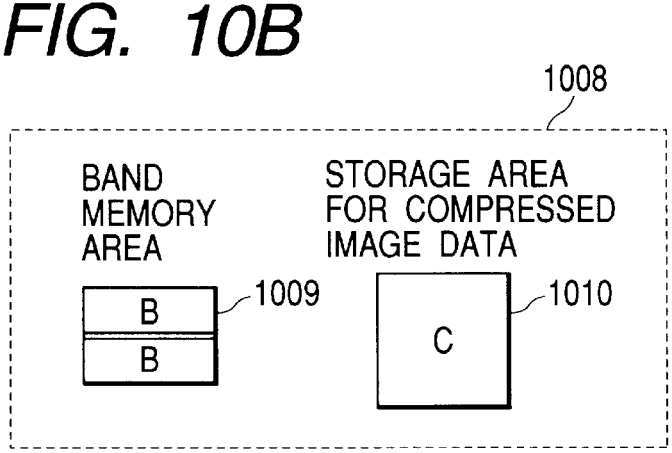
FIG. 10B is a diagram showing how memory is utilized in the printing apparatus of the present invention during asynchronous rendering.
Figure 10C:
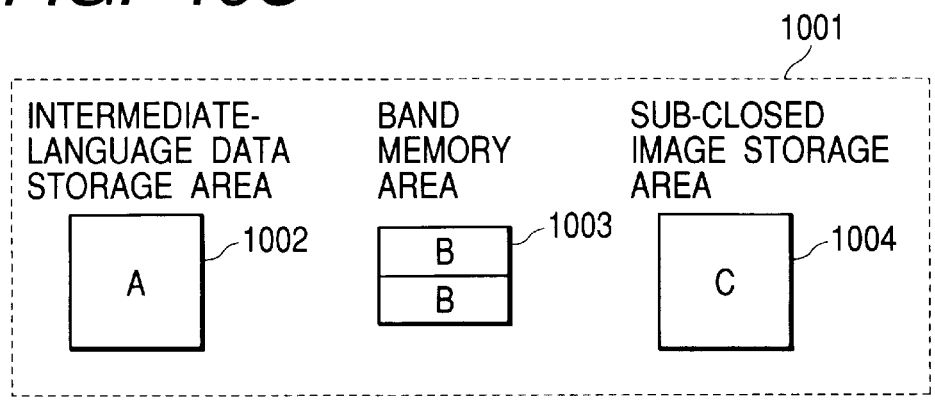
FIG. 10C is a diagram showing how memory is utilized in a conventional printing apparatus.

FIG. 10A shows how memory is utilized in the printing apparatus of the present invention during synchronous rendering. FIG. 10B shows how memory is utilized in the printing apparatus of the present invention during asynchronous rendering, and FIG. 10C shows how memory is utilized in a conventional printing apparatus.

As shown in FIG. 10A, during synchronous rendering 1005, intermediate-language data which lend itself to hardware-based, high-speed rendering is stored in an intermediate-language data storage area 1006 of size A and two band memory areas 1007 for synchronous banding are provided such that their total size will be 2B.

During asynchronous rendering 1008, a band memory area 1009 has size 2B to carry out compression and rendering in parallel and a storage area 1010 for compressed image data stores one page of extracted images after compression. The storage area 1010 has size C, the same size as an area required during sub-closing by the conventional printing apparatus.

Thus, the memory size of the printing apparatus according to the present invention is A+2B during synchronous rendering 1005 and C+2B during asynchronous rendering 1008.

On the other hand, regarding the memory required by the conventional printing apparatus during synchronous rendering and sub-closing 1001, as shown in FIG. 10C, the size of an intermediate-language data storage area 1002 which stores intermediate-language data that lend itself to hardware-based, high-speed rendering is A, the size of two band memory areas 1003 required for synchronous banding is 2B, and the size of sub-closed image data storage area 1004 used for sub-closing or pre-banding is C, resulting in a total size of A+2B+C.

Thus, it can be seen that the printing apparatus of the present invention can save memory compared to the conventionally configured printing apparatus. Besides, when designed not to use the size-A memory and size-C memory simultaneously, the printing apparatus of the present invention can save even more memory.

Also, the printing apparatus of the present invention has the following effect on performance. During simple data processing, which is run in synchronous rendering mode, the printing apparatus of the present invention generates intermediate-language data in the host unlike the conventional printing apparatus which generates intermediate-language data in the printer. Host processing time is longer than in PDL mode of the conventional printing apparatus, but this is almost offset by shorter processing time on the printer side. The difference is highly dependent on the operating environment, but there is not much difference considering the use of simple data.

However, the printing apparatus of the present invention has a great advantage "when the size of commands is large" or "when there are so many bands that processing cannot keep up". Specifically, whereas in the case of the conventional printing apparatus, which repeats a sub-closing process, the time required to repeat a compression/decompression process is a main cause for delay, the printing apparatus of the present invention, which operates in asynchronous rendering mode, requires no compression process during a band rendering process. Thus, printer processing time is shorter by the amount equal to the time required for a compression/decompression process multiplied by the number of compression/decompression processes.

Next, description will be given of how intermediate-language data of a multi-valued color image is compressed in the printer.

Figure 11:
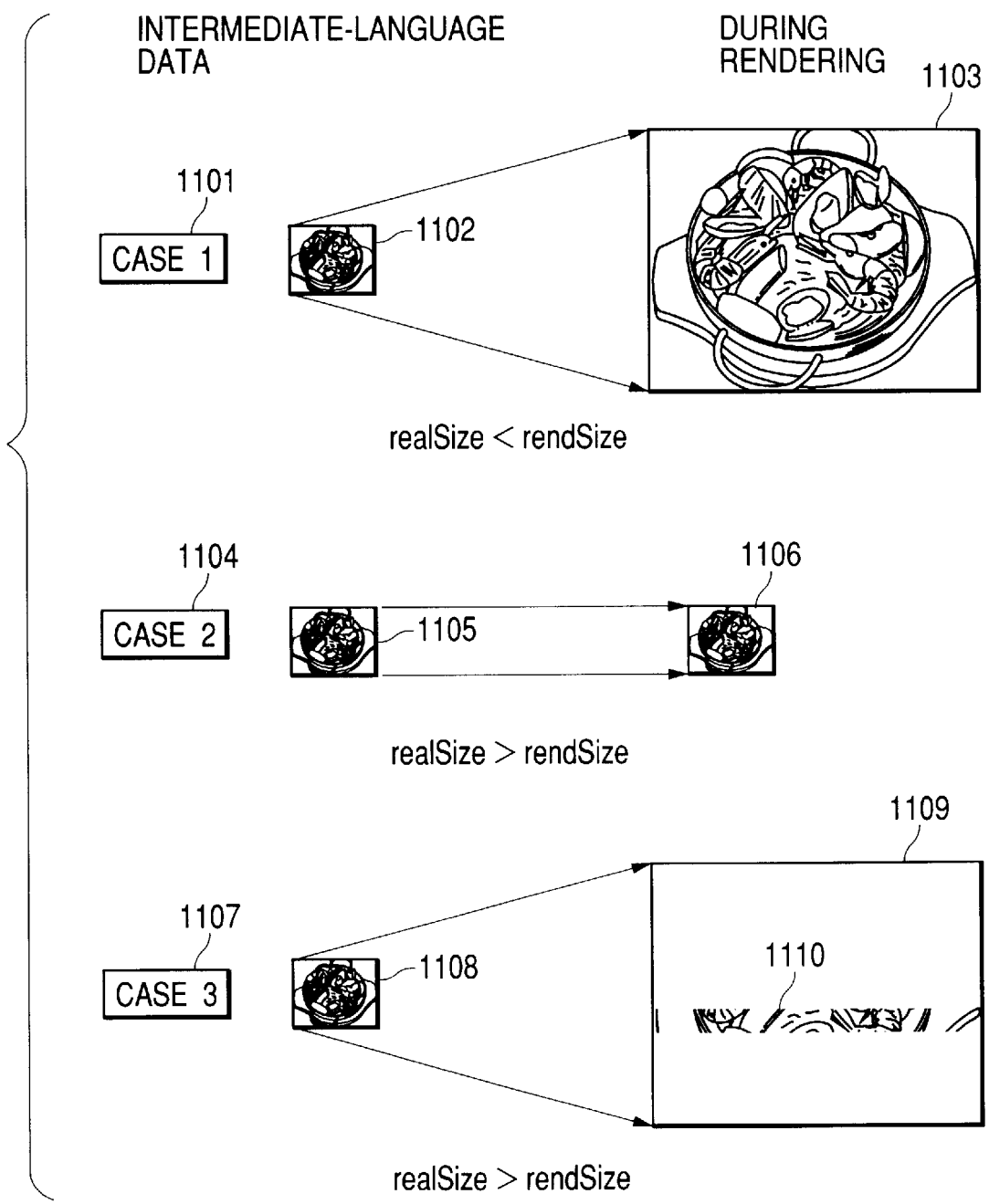
FIG. 11 is a diagram illustrating how intermediate-language data of a multi-value color image is compressed in a printer connected to the printing apparatus of the present invention.
Figure 12:
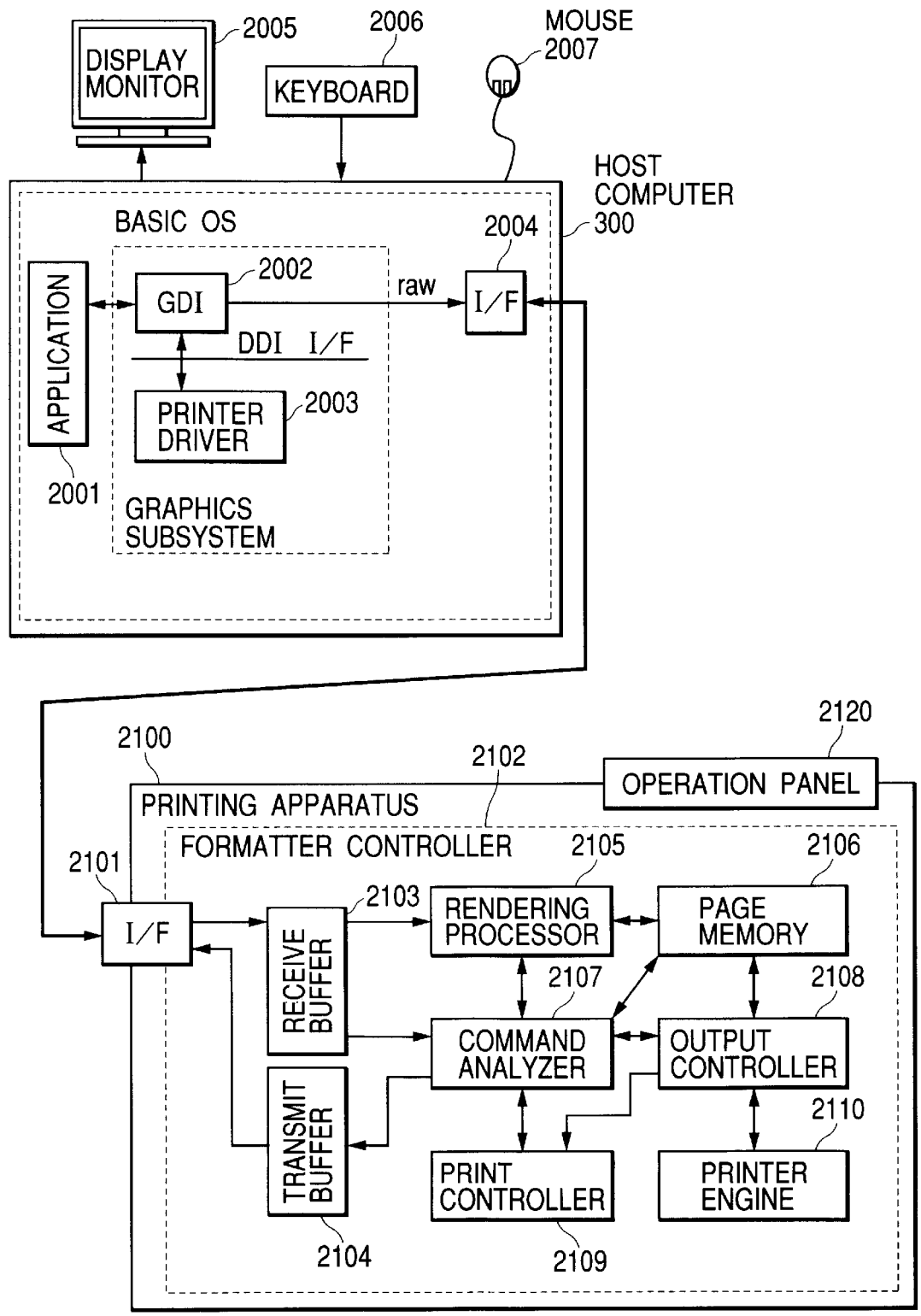
FIG. 12 is a diagram illustrating a flow of a print control method and printing processes in a conventional printing system.

FIG. 11 is a diagram illustrating how intermediate-language data of a multi-valued color image is compressed in a printer connected to the printing apparatus of the present invention. In Case 1 indicated by 1101, when processing color fine-gradation image data 1102 (8 bits/pixel each for YMCK colors=32 bits/pixel in total) which is a kind of intermediate-language data to magnify the image at a magnification of 8 (height×width) and with output gradation of 2 bits/pixel for each color during a rendering process in the printer as indicated by 1103, a smaller data size will result if intermediate-language is generated using the 32-bits/pixel source data as it is.

On the other hand, it the case of 1×magnification (or reduction) such as in Case 2 indicated by 1104 or even in the case of a large magnification such as in Case 3 indicated by 1107, if a drawing area is small due to clipping 1110, the size of intermediate-language data can be reduced more by magnification/reduction, clipping, and half-toning processes (2 bits/pixel each for YMCK colors=8 bits/pixel in total). In terms of total processing time, however, it is more efficient to carry out hardware-based, high-speed magnification and half-toning processes in synchronization with the engine.

Thus, the printer connected to the printing apparatus of the present invention generates intermediate-language data by extracting only the fine-gradation image data which satisfies the above condition instead of carrying out all the above processes when storing intermediate-language data, spending much time preparing the data. This method is useful for image data and if the renderer uses a compression method which allows real-time expansion, intermediate-language data storage area can be used more efficiently.

Incidentally, the present invention may be applied either to a system consisting of two or more apparatus (e.g., a host computer, interface devices, a reader, a printer, and the like) or to equipment consisting of a single apparatus (e.g., a copier, a printer, a facsimile machine, or the like).

Also, the object of the present invention can also be achieved by a storage medium containing the software program code called a printer driver that implements the functions of the above embodiment: it is supplied to a system or apparatus, whose computer (or a CPU or MPU) then reads the program code out of the storage medium and executes it. In that case, the program code itself read out from the storage medium will implement the functions of the above embodiment, and the storage medium which stores the program code will constitute the present invention.

The storage medium for supplying the program code may be, for example, a floppy (registered trademark) disk, hard disk, optical disk, magneto-optical disk, CD-ROM, CD-R, magnetic tape, non-volatile memory card, ROM, or the like.

Also, the functions of the above embodiment may be implemented not only by the program code read out and executed by the computer, but also by part or all of the actual processing executed, in accordance with instructions from the program code, by an OS or the like running on the computer.

Furthermore, the functions of the above embodiment may also be implemented by part or all of the actual processing executed by a CPU or the like contained in a function expansion board inserted in the computer or a function expansion unit connected to the computer if the processing is performed in accordance with instructions from the program code that has been read out of the storage medium and written into memory on the function expansion board or unit.

In the case where the present invention is applied to a storage medium, the storage medium will store the program code that corresponds to the flowcharts described above.

As many apparently widely different embodiments of the present invention can be made without departing from the spirit and scope thereof, it is to be understood that the invention is not limited to the specific embodiments thereof except as defined in the appended claims.

As described above, according to the present invention, a printing apparatus comprises a print mode determination unit which judges whether intermediate-language data can fit in a page memory when print command data is converted in normal print mode and selects the normal print mode if the data can fit in, but selects compressed print mode if the data cannot fit in. Furthermore, the print mode determination unit comprises data reprocessing unit which, when the compressed print mode is selected, reduces any compressible part of intermediate-language data which corresponds to fine-gradation image data in normal print mode using a compression/decompression process, output gradation conversion process, clipping process, or reversible compression process whichever is applicable before storing it again in the page memory. This makes it possible to provide a printing system and printing apparatus which can ensure high-speed, normal printing with small memory requirements even when lots of print commands are sent to a printer.

What is claimed is:

1. A printing system in which a computer provided with a printer driver is connected with a printing apparatus which runs a rendering process in response to print command data generated by said printer driver, wherein:

said printer driver comprises data conversion means for converting drawing commands into an intermediate-language data format processible at high speed within said printing apparatus, data holding means for storing one page of the converted intermediate-language data, data information collection means for collecting attribute information about the intermediate-language data stored in the data holding means, and print data generation means for generating print data consisting of one page of intermediate-language data and intermediate-language data information;

said printing apparatus comprises data extraction means for extracting the intermediate-language data and intermediate-language data information by interpreting the print data from said printer driver, page data holding means for storing one page of the intermediate-language data, print mode determination means for determining a print mode based on the intermediate-language data information extracted from the print data, and rendering means for running a rendering process using one page of the intermediate-language data in the print mode determined by the print mode determination means;

when one page of intermediate-language data is stored in said data holding means, the print data generation means of said printer driver generates print data by adding the intermediate-language data information stored in said data holding means to the top of the page of the intermediate-language data; and the print mode determination means of said printing apparatus judges whether said intermediate-language data can fit in said page data holding means when said print data is converted in normal print mode and selects the normal print mode if the data can fit in, but selects compressed print mode if the data cannot fit in.

2. The printing system according to claim 1, wherein said print mode determination means comprises data reprocessing means which, when the compressed print mode is selected, reduces any compressible part of intermediate-language data which corresponds to fine-gradation image data in normal print mode using a compression/decompression process, output gradation conversion process, clipping process, or reversible compression process whichever is applicable before storing it in said page data holding means.

3. The printing system according to claim 1, wherein said printer driver further comprises:

data registration means for registering said intermediate-language data in a band list which corresponds to band processing performed within said printing apparatus, wherein said data information collection means collects intermediate-language data information for each band list registered with said data registration means.

4. The printing system according to claim 3, wherein said print mode determination means of said printing apparatus decides on either synchronous rendering mode in which rendering is performed in synchronization with an engine or asynchronous rendering mode in which rendering is performed out of synchronization with the engine.

5. The printing system according to claim 4, wherein the print mode determination means of said printing apparatus determines the size of the intermediate-language data contained in a page from page information, compares it with memory size of said page data holding means, estimates the rendering time of each band based on the intermediate-language data, judges based on the rendering time whether processing can keep up with engine speed, and selects the synchronous rendering mode if the processing can keep up with the engine speed, but selects the asynchronous rendering mode if the processing cannot keep up with the engine speed.

6. The printing system according to claim 5, wherein in said asynchronous rendering mode said printing apparatus renders the intermediate-language data stored in a receive buffer immediately using a rendering band memory, stores rendered bands in compressed form, starts the engine when one page of compressed bands are prepared, expands band image data stored in compressed form beginning with the top band to the band memory, and converts them into video signals in synchronization with the engine.

7. The printing system according to claim 5, wherein in said synchronous rendering mode said printing apparatus registers print command data transmitted on a band-by-band basis in the band list of said printing apparatus in sequence as intermediate-language data, starts the engine when one page of a band list is generated, renders the intermediate-language data in the band memory in sequence beginning with the one registered at the top of the band list, and converts the rendered image data in the band memory into video signals in synchronization with the engine.

8. A printing apparatus comprising:

data extraction means for extracting intermediate-language data and intermediate-language data information by interpreting print data from a printer driver;

page data holding means for storing one page of the intermediate-language data;

print mode determination means for estimating the size of the print data based on the extracted intermediate-language data information and determining a print mode based on the results of estimation; and rendering means for rendering one page of the intermediate-language data in the print mode determined by the print mode determination means, wherein said print mode determination means judges whether said intermediate-language data can fit in said page data holding means when said print data is converted in normal print mode and selects the normal print mode if the data can fit in, but selects compressed print mode if the data cannot fit in.

9. The printing apparatus according to claim 8, wherein said print mode determination means comprises data reprocessing means which, when the compressed print mode is selected, reduces any compressible part of intermediate-language data which corresponds to fine-gradation image data in normal print mode using a compression/decompression process, output gradation conversion process, clipping process, or reversible compression process whichever is applicable before storing it in said page data holding means.

10. An information processing apparatus comprising a host computer having a printer driver for use with a printing apparatus, said information processing apparatus comprising:

data conversion means for converting drawing commands into an intermediate-language data, the intermediate-language data being processible at a high speed within the printing apparatus;

storing means for storing the intermediate-language data converted by said data conversion means in a memory;

attribute information generation means for generating attribute information about the intermediate-language data stored in the memory; and print data generation means for generating print data including the intermediate-language data and the attribute information, wherein the intermediate-language data is divided into a plurality of bands suitable for band processing performed within the printing apparatus, and said attribute information generation means generates the attribute information for each band based on one page of the intermediate-language data stored in the memory.

11. An apparatus according to claim 10, wherein the attribute information for each band includes the size and the number of the intermediate-language data included in the band.

12. A method for use with a printing system, in which a computer provided with a printer driver is connected with a printing apparatus, which runs a rendering process in response to print command data generated by the printer driver, wherein:

the printer driver performs the steps of:
converting drawing commands into an intermediate-language data format processible at high speed within the printing apparatus;
storing one page of the converted intermediate-language data in memory;
collecting attribute information about the intermediate-language data stored in the memory;
generating print data consisting of one page of intermediate-language data and intermediate-language attribute information;

the printing apparatus performs the steps of:
extracting the intermediate-language data and intermediate-language attribute information by interpreting the print data from the printer driver;
storing one page of the intermediate-language data;
determining a print mode based on the intermediate-language data information extracted from the print data; and
rendering using one page of the intermediate-language data in the print mode determined by the print mode determination step, wherein when one page of intermediate-language data is stored in the memory, the printer driver generates print data by adding the intermediate-language data information stored in memory to the top of the page of the intermediate-language data, and wherein in the step of determining a print mode, the printing apparatus judges whether the intermediate-language data can fit in the memory when the print data is converted in normal print mode and selects the normal print mode if the data fits, but selects compressed print mode if the data cannot fit.

13. A method according to claim 12, wherein said step of determining a print mode further comprises:

when the compressed print mode is selected, reducing any compressible part of intermediate-language data which corresponds to fine-gradation image data in normal print mode using a compression/decompression process, output gradation conversion process, clipping process, or reversible compression process, whichever is applicable, before storing the data in the memory.

14. A method according to claim 12, wherein the printer driver further performs the step of:

registering the intermediate-language data in a band list which corresponds to band processing performed within the printing apparatus, wherein said step of collecting attribute information collects intermediate-language attribute information for each band list registered by said data registration step.

15. A method according to claim 14, wherein said step of determining a print mode performed by said printing apparatus further comprises the step of deciding on either a synchronous rendering mode, in which rendering is performed in synchronization with an engine, or an asynchronous rendering mode, in which rendering is performed out of synchronization with the engine.

16. A method according to claim 15, wherein said step of determining a print mode performed by the printing apparatus further comprises:

determining the size of the intermediate-language data contained in a page from page information;
comparing the determined size with a size of the memory;
estimating the rendering time of each band based on the intermediate-language data;
judging, based on the rendering time, whether processing can keep up with engine speed; and
selecting the synchronous rendering mode, if the processing can keep up with the engine speed, or selecting the asynchronous rendering mode, if the processing cannot keep up with the engine speed.

17. A method according to claim 16, wherein, in the asynchronous rendering mode, the printing apparatus performs the steps of: rendering the intermediate-language data stored in a receive buffer immediately using a rendering band memory, storing rendered bands in compressed form, starting the engine when one page of compressed bands is prepared, expanding band image data stored in compressed form beginning with the top band to the band memory, and converting them into video signals in synchronization with the engine.

18. A method according to claim 16, wherein, in the synchronous rendering mode, the printing apparatus performs the steps of: registering print command data transmitted on a band-by-band basis in the band list of the printing apparatus in sequence as intermediate-language data, starting the engine when one page of a band list is generated, rendering the intermediate-language data in the band memory in sequence beginning with the one registered at the top of the band list, and converting the rendered image data in the band memory into video signals in synchronization with the engine.

19. A printing method comprising:
  extracting intermediate-language data and intermediate-language data information by interpreting print data from a printer driver;
  storing one page of the intermediate-language data in memory;
  estimating the size of the print data based on the extracted intermediate-language data information;
  determining a print mode based on the results of estimation; and
  rendering one page of the intermediate-language data in the print mode determined by the print mode determination step,
  wherein the print mode determination step judges whether the intermediate-language data can fit in the memory when the print data is converted in normal print mode, and selects the normal print mode if the data can fit in memory, or selects compressed print mode if the data cannot fit in memory.

20. A method according to claim 19, wherein said step of determining a print mode further comprises:
  reducing, when the compressed print mode is selected, any compressible part of intermediate-language data which corresponds to fine-gradation image data in normal print mode using a compression/decompression process, output gradation conversion process, clipping process, or reversible compression process, whichever is applicable, before storing it in the memory.

21. A method for use with a host computer having a printer driver for use with a printing apparatus, said method comprising:
  converting drawing commands into an intermediate-language data, the intermediate-language data being processible at a high speed within the printing apparatus;
  storing the converted intermediate-language data in a memory;
  generating attribute information about the intermediate-language data stored in the memory; and
  generating print data including both of the intermediate-language data and the attribute information,
  wherein when the intermediate-language data is divided into a plurality of bands suitable for band processing within the printing apparatus, the step of generating attribute information generates the attribute information for each band based on one page of the intermediate-language data stored in the memory.

22. The method according to claim 21, wherein the attribute information for each band includes the size and the number of the intermediate-language data included in the band.

23. A printing system in which a computer provided with a printer driver is connected with a printing apparatus, which runs a rendering process in response to print command data generated by said printer driver, wherein:
  said printer driver comprises:
    data converter adapted to convert drawing commands into an intermediate-language data format processible at high speed within said printing apparatus;
    memory adapted to store one page of the converted intermediate-language data;
    data information collector adapted to collect attribute information about the intermediate-language data stored in said memory; and
    print data generator adapted to generate print data consisting of one page of intermediate-language data and intermediate-language data information;
  said printing apparatus comprises:
    data extractor adapted to extract the intermediate-language data and intermediate-language data information by interpreting the print data from said printer driver;
    memory adapted to store one page of the intermediate-language data;
    print mode determiner adapted to determine a print mode based on the intermediate-language data information extracted from the print data; and
    renderer adapted to run a rendering process using one page of the intermediate-language data in the print mode determined by the print mode determiner,
  wherein when one page of intermediate-language data is stored in said memory, the print data generator of said printer driver is adapted to generate print data by adding the intermediate-language data information stored in said memory to the top of the page of the intermediate-language data, and the print mode determiner of said printing apparatus is adapted to judge whether said intermediate-language data can fit in said memory when the print data is converted in normal print mode, and to select the normal print mode if the data can fit in, or to select compressed print mode if the data cannot fit in.

24. The printing system according to claim 23, wherein said print mode determiner further comprises a data reprocessor which, when the compressed print mode is selected, is adapted to reduce any compressible part of intermediate-language data which corresponds to fine-gradation image data in normal print mode using a compression/decompression process, output gradation conversion process, clipping process, or reversible compression process, whichever is applicable, before storing it in said memory.

25. The printing system according to claim 23, wherein said printer driver further comprises:
  data registration unit for registering the intermediate-language data in a band list which corresponds to band processing performed within said printing apparatus,
  wherein said data information collector is adapted to collect intermediate-language data information for each band list registered with said data registration unit.

26. The printing system according to claim 25, wherein said print mode determiner of said printing apparatus is adapted to decide on either a synchronous rendering mode, in which rendering is performed in synchronization with an engine, or an asynchronous rendering mode, in which rendering is performed out of synchronization with the engine.

27. The printing system according to claim 26, wherein said print mode determiner of said printing apparatus is adapted to determine a size of the intermediate-language data contained in a page from page information, to compare it with a size of said memory, to estimate the rendering time of each band based on the intermediate-language data, to judge based on the rendering time whether processing can keep up with engine speed, and to select either the synchronous rendering mode if the processing can keep up with the engine speed, or the asynchronous rendering mode if the processing cannot keep up with the engine speed.

28. The printing system according to claim 27, wherein in said asynchronous rendering mode said printing apparatus renders the intermediate-language data stored in a receive buffer immediately using a rendering band memory, stores rendered bands in compressed form, starts the engine when one page of compressed bands is prepared, expands band image data stored in compressed form beginning with the top band to the band memory, and converts them into video signals in synchronization with the engine.

29. The printing system according to claim 27, wherein, in said synchronous rendering mode, said printing apparatus registers print command data transmitted on a band-by-band basis in the band list of said printing apparatus in sequence as intermediate-language data, starts the engine when one page of a band list is generated, renders the intermediate-language data in the band memory in sequence beginning with the one registered at the top of the band list, and converts the rendered image data in the band memory into video signals in synchronization with the engine.

30. A printing apparatus comprising;
   data extractor adapted to extract intermediate-language data and intermediate-language data information by interpreting print data from a printer driver;
   storage to store one page of the intermediate-language data;
   print mode determiner adapted to estimate the size of the print data based on the extracted intermediate-language data information and to determine a print mode based on the results of estimation; and
   renderer adapted to render one page of the intermediate-language data in the print mode determined by the print mode determiner,
   wherein said print mode determiner judges whether the intermediate-language data can fit in said storage when the print data is converted in normal print mode, and selects the normal print mode if the data can fit in, or selects compressed print mode if the data cannot fit in.

31. The printing apparatus according to claim 30, wherein said print mode determiner further comprises:
   data reprocessor which, when the compressed print mode is selected, is adapted to reduce any compressible part of intermediate-language data which corresponds to fine-gradation image data in normal print mode using a compression/decompression process, output gradation conversion process, clipping process, or reversible compression process, whichever is applicable, before the data is stored in said storage.

32. An information processing apparatus that works as a host computer having a printer driver for a printing apparatus, said information processing apparatus comprising:
   data converter adapted to convert drawing commands into an intermediate-language data, the intermediate-language data being processible at a high speed within the printing apparatus;
   memory adapted to store the intermediate-language data converted by said data converter;
   attribute information generator adapted to generate attribute information about the intermediate-language data stored in said memory; and
   print data generator adapted to generate print data including both of the intermediate-language data and the attribute information,
   wherein when the intermediate-language data is divided into a plurality of bands suitable for band processing within the printing apparatus, said attribute information generator is adapted to generate the attribute information for each band based on one page of the intermediate-language data stored in said memory.

33. An apparatus according to claim 32, wherein the attribute information for each band includes the size and the number of the intermediate-language data included in the band.

* * * * *